(12) United States Patent
Okabe (10) Patent No.: US 8,038,953 B2
(45) Date of Patent: Oct. 18, 2011

(54) MAT MATERIAL, EXHAUST GAS TREATING APPARATUS, AND MUFFLER

(75) Inventor: Takahiko Okabe, Takahama (JP)

(73) Assignee: Ibiden Co., Ltd., Ogaki-shi (JP)

( * ) Notice: Subject to any disclaimer, the term of this patent is extended or adjusted under 35 U.S.C. 154(b) by 728 days.

(21) Appl. No.: 12/106,120

(22) Filed: Apr. 18, 2008

(65) Prior Publication Data

US 2009/0087352 A1  Apr. 2, 2009

(30) Foreign Application Priority Data

Sep. 28, 2007 (JP) ................................. 2007-255888

(51) Int. Cl.
*B01D 50/00* (2006.01)
(52) U.S. Cl. ........................................ 422/179; 422/180
(58) Field of Classification Search .................. 422/168, 422/177, 179, 180
See application file for complete search history.

(56) References Cited

U.S. PATENT DOCUMENTS

| | | | |
|---|---|---|---|
| 2,920,373 | A | 1/1960 | Gresham |
| 3,817,820 | A | 6/1974 | Smith, II |
| 4,846,302 | A * | 7/1989 | Hetherington ................ 181/243 |
| 5,250,269 | A * | 10/1993 | Langer ........................... 422/179 |
| RE36,756 | E | 6/2000 | Wahl et al. |
| 6,564,437 | B2 | 5/2003 | Meng et al. |
| 2007/0081926 | A1 | 4/2007 | Okabe |
| 2009/0049690 | A1 | 2/2009 | Eguchi |

FOREIGN PATENT DOCUMENTS

| | | |
|---|---|---|
| CN | 2408240 | 11/2000 |
| EP | 1329601 | 7/2003 |
| EP | 1772600 | 4/2007 |
| FR | 2663961 | 1/1992 |
| JP | 7-286514 | 10/1995 |
| JP | 09-228820 | 9/1997 |
| JP | 2006-207393 | 8/2006 |
| JP | 2007-127112 | 5/2007 |
| KR | 2007-39389 | 4/2007 |
| WO | WO 2004011785 A1 * | 2/2004 |

OTHER PUBLICATIONS

Office Action issued by the Chinese Patent office on Mar. 12, 2010.
Japanese Office Action for corresponding JP Application No. 2007-255888, Aug. 16, 2011.

* cited by examiner

*Primary Examiner* — Tom Duong
(74) *Attorney, Agent, or Firm* — Ditthavong Mori & Steiner, P.C.

(57) ABSTRACT

A mat material includes inorganic fibers, a first surface, and a second surface opposite to the first surface. The mat material has plural needle traces formed by performing a needling treatment. The needle traces extend from the first surface toward the second surface and from the second surface toward the first surface. There is no depth in the mat material that the needle traces do not reach. There is substantially no protrusion of a bundle of the inorganic fibers at a position on the second surface that lies on a line extending from each of the needle traces extending from the first surface. There is substantially no protrusion of a bundle of the inorganic fibers at a position on the first surface that lies on a line extending from each of the needle traces extending from the second surface.

19 Claims, 8 Drawing Sheets

MAT MATERIAL, EXHAUST GAS TREATING APPARATUS, AND MUFFLER

CROSS-REFERENCE TO RELATED APPLICATIONS

The present application claims priority under 35 U.S.C. §119 to Japanese Priority Application No. 2007-255888 filed Sep. 28, 2007, the entire contents of which are hereby incorporated by reference.

BACKGROUND OF THE INVENTION

1. Field of the Invention

The present invention relates to mat materials, exhaust gas treating apparatuses, and mufflers.

2. Discussion of the Background

The number of automobiles has drastically increased since the turn of the century, and the amount of exhaust gas emissions from the internal combustion engines of automobiles shows no sign of slowing. Particularly, various substances contained in diesel engine exhaust gases are a major cause of pollution and seriously affecting the global environment.

Under such circumstances, various exhaust gas treating apparatuses have been proposed and put to practical use. A typical exhaust gas treating apparatus comprises an exhaust gas treating member having a number of fine openings which is installed in a casing (such as a metal shell) disposed at a location on exhaust piping connected to the engine exhaust gas manifold. Examples of such an exhaust gas treating member include a catalyst supporter (catalytic converter) and a diesel particulate filter (DPF). In the case of a DPF, fine particles are trapped by the surrounding walls of the openings in the aforementioned structure as the exhaust gas passes through the exhaust gas treating member, thus removing the fine particles from the exhaust gas. The constituent material of the exhaust gas treating member includes ceramics as well as metals and alloys. A well-known example of a ceramic exhaust gas treating member is a honeycomb filter made of cordierite. In recent years, porous sintered silicon carbide has been often used as an exhaust gas treating member material from the viewpoint of heat resistance, mechanical strength, and chemical stability.

Normally, between such an exhaust gas treating member and the casing, a retaining/sealing material is installed. The retaining/sealing material is used to prevent damage due to a contact between the exhaust gas treating member and the casing during the running of the vehicle. It is also used to prevent leakage of exhaust gas through a gap between the casing and the exhaust gas treating member. The retaining/sealing material also has the function of preventing the exhaust gas treating member from falling off due to the exhaust pressure of exhaust gas. Furthermore, since the exhaust gas treating member needs to be maintained at a high temperature in order to maintain reactivity, a good heat-insulating property is required in the retaining/sealing material. One example of material that satisfies these requirements is a mat material consisting of an inorganic fiber such as an alumina-based fiber.

Such a mat material is wound around at least a part of the external circumferential surfaces of the exhaust gas treating member except for its opening surfaces, and integrally affixed to the exhaust gas treating member by taping, for example. Thereafter, the integrated component is installed inside a casing by press-fitting or otherwise, thereby forming an exhaust gas treating apparatus.

Generally, the manufacturing process for the aforementioned mat material involves a needling treatment, which is a process of making a mat material thinner by putting a needle into and out of the mat material. The process causes the inorganic fibers to become woven in the thickness direction of the mat material while the thickness of the mat material is reduced. In this way, the loft of the mat material can be reduced (see Japanese Laid-Open Patent Application No. 07-286514, for example). The contents of Japanese Laid-Open Patent Application No. 07-286514 are incorporated herein by reference in their entirety.

SUMMARY OF THE INVENTION

In one embodiment, a mat material includes inorganic fibers, a first surface, and a second surface opposite to the first surface. The mat material has plural needle traces formed by performing a needling treatment. The needle traces extend from the first surface toward the second surface and from the second surface toward the first surface. There is no depth in the mat material that the needle traces do not reach. There is substantially no protrusion of a bundle of the inorganic fibers at a position on the second surface that lies on a line extending from each of the needle traces extending from the first surface. There is substantially no protrusion of a bundle of the inorganic fibers at a position on the first surface that lies on a line extending from each of the needle traces extending from the second surface.

In another embodiment, at least a part of the needle traces that extend from the first surface has a penetration depth D which is greater than half of a thickness of the mat material and smaller than the thickness of the mat material, and at least a part of the needle traces that extend from the second surface reaches a depth greater than a value obtained by subtracting the penetration depth D from the thickness of the mat material.

In another embodiment, at least a part of the needle traces that extend from the first surface reaches a depth that is greater than half of a thickness of the mat material, and wherein at least a part of the needle traces that extend from the second surface reaches a depth that is greater than half of the thickness of the mat material.

In another embodiment, the mat material has a basis weight in a range of from about 1500 $g/m^2$ to about 2800 $g/m^2$ and a thickness in a range of from about 9 mm to about 20 mm.

The mat material may include an inorganic binder and/or an organic binder.

In another embodiment, the inorganic fibers may include a mixture of alumina and silica.

In another embodiment, the invention provides an exhaust gas treating apparatus comprising a casing; an exhaust gas treating member housed in the casing; and the aforementioned mat material.

In a preferred embodiment of the exhaust gas treating apparatus, the mat material is wound around at least a part of an external circumferential surface of the exhaust gas treating member.

In another preferred embodiment, the exhaust gas treating apparatus includes an inlet pipe disposed at an entry portion of the exhaust gas treating member; and an outlet pipe disposed at an exit portion of the exhaust gas treating member, wherein the mat material is used as a heat-insulating material disposed at least a portion of the inlet pipe.

In another preferred embodiment of the exhaust gas treating apparatus, the exhaust gas treating member comprises an exhaust gas filter or a catalyst supporter having catalyst.

In another embodiment, the invention provides a muffler comprising an inner pipe; an outer shell covering the inner pipe; and a sound absorbing material disposed between the inner pipe and the outer shell and comprising the aforementioned mat material.

Thus, in accordance with an embodiment of the invention, a mat material having an appropriate interlaminar strength and improved handleability is provided. In another embodiment, an exhaust gas treating apparatus is provided which has the mat material as a retaining/sealing material and/or a heat-insulating material. In yet another embodiment, a muffler is provided which has the mat material as a sound absorbing material.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE EMBODIMENTS

In the following, preferred embodiments of the present invention are described with reference to the drawings.

Figure 1:
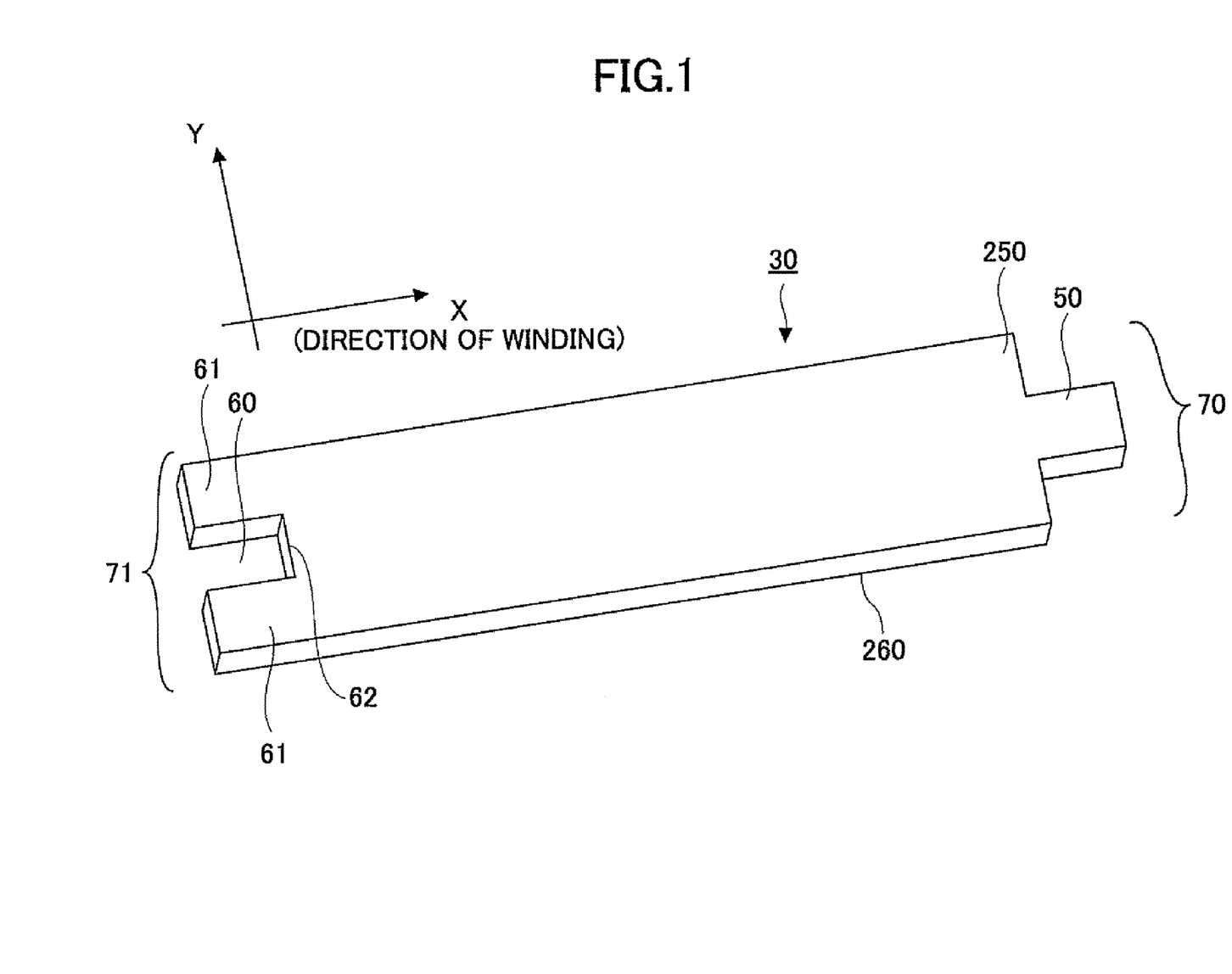
FIG. 1 shows a mat material according to an embodiment of the invention.
Figure 2:
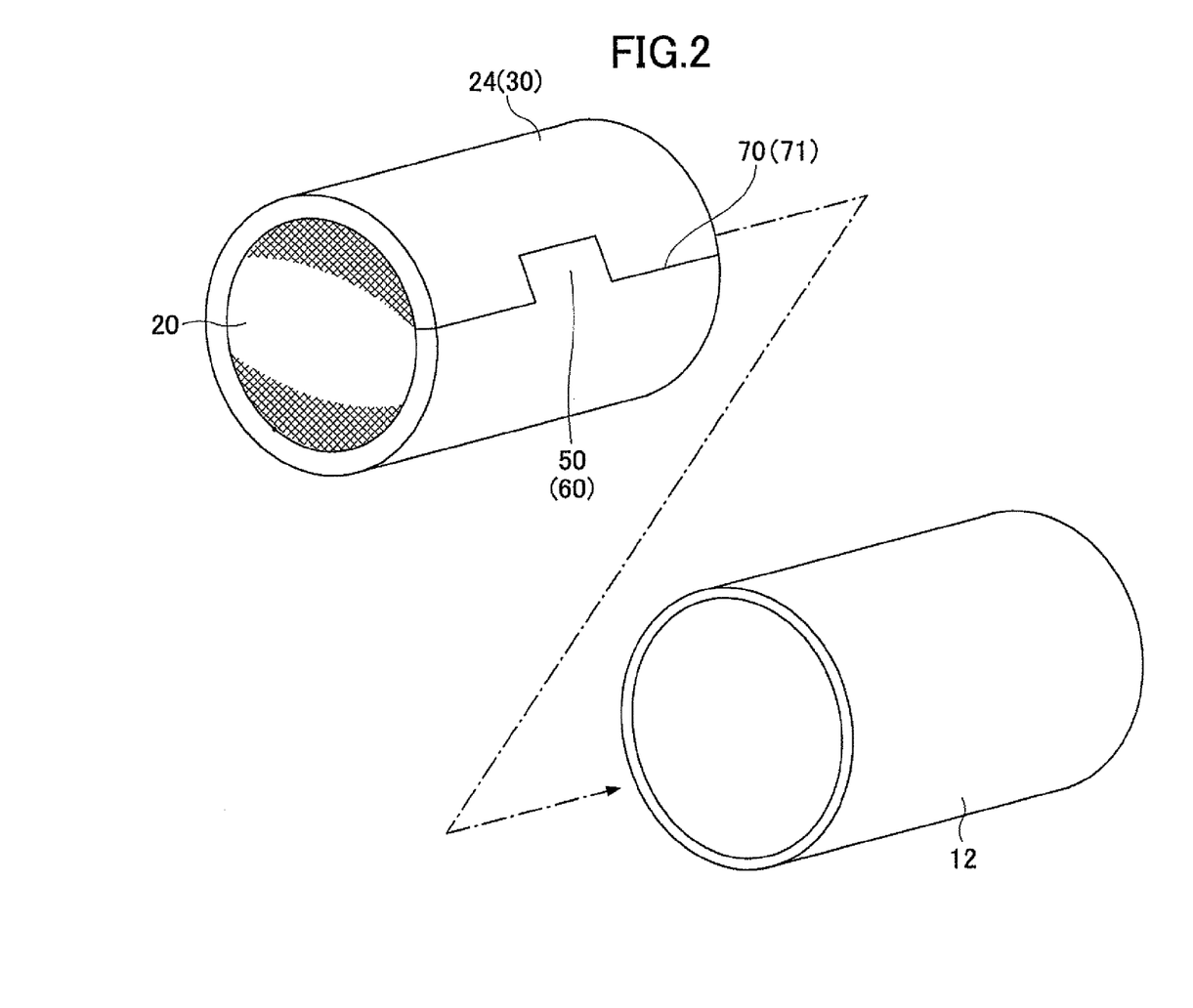
FIG. 2 shows an exhaust gas treating apparatus in which the mat material of the embodiment shown in FIG. 1 is used as a retaining/sealing material.

FIG. 1 shows a mat material 30 according to an embodiment of the present invention. FIG. 2 is a disassembled view of an exhaust gas treating apparatus comprising the mat material of the embodiment shown in FIG. 1 as a retaining/sealing material.

The mat material 30 comprises a number of inorganic fibers of, e.g., alumina and silica. As shown in FIG. 1, the mat material 30 is formed in a substantially rectangular shape having long sides (parallel to an X direction) and short sides 70 and 71 (parallel to a Y direction). The short sides 70 and 71 have a protruding fitting portion 50 and a recessed fitting portion 60, respectively. The short side 71 also has two projecting portions 61 formed adjacent to the recessed fitting portion 60. However, the shape of the short sides 70 and 71 of the mat material of the invention shown in FIG. 1 is merely exemplary, and other shapes may be employed. For example, there may be no such fitting portions as shown in FIG. 1, or each short side may have plural protruding fitting portions 50 and recessed fitting portions 60. In the present disclosure, "substantially rectangular" refers to such a rectangular shape as shown in FIG. 1, having a set of the protruding fitting portion 50 and the recessed fitting portion 60 in the short sides. A "substantially rectangular" shape may have angles other than about 90° at the corner at which a long side and a short side intersect with each other (such as a shape having a curvature).

When used as a retaining/sealing material 24 in the exhaust gas treating apparatus, the mat material 30 is disposed such that its long-side direction lies in the direction in which it is wound (i.e., the X direction). Upon being wound around an exhaust gas treating member 20, which may be a catalyst supporter, the protruding fitting portion 50 and the recessed fitting portion 60 of the mat material 30 are fitted together as shown in FIG. 2, thereby affixing the mat material 30 on the exhaust gas treating member 20. The exhaust gas treating member 20 with the retaining/sealing material 24 wound thereon is then installed inside a casing 12, which may be made of a metal, by press-fitting, for example.

Figure 3:
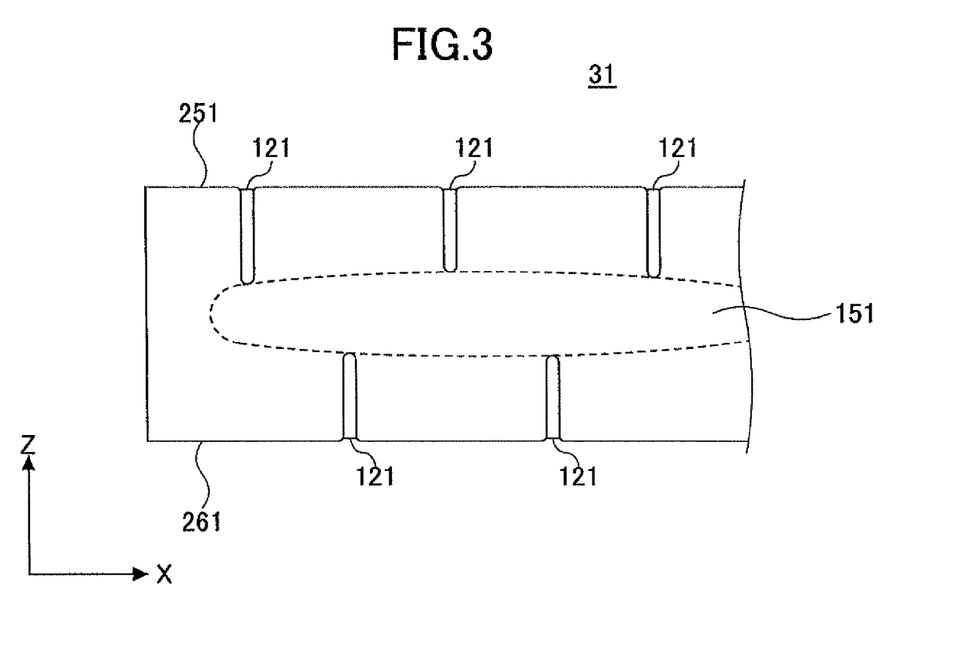
FIG. 3 schematically shows a cross section of a conventional mat material (of Type I)
Figure 4:
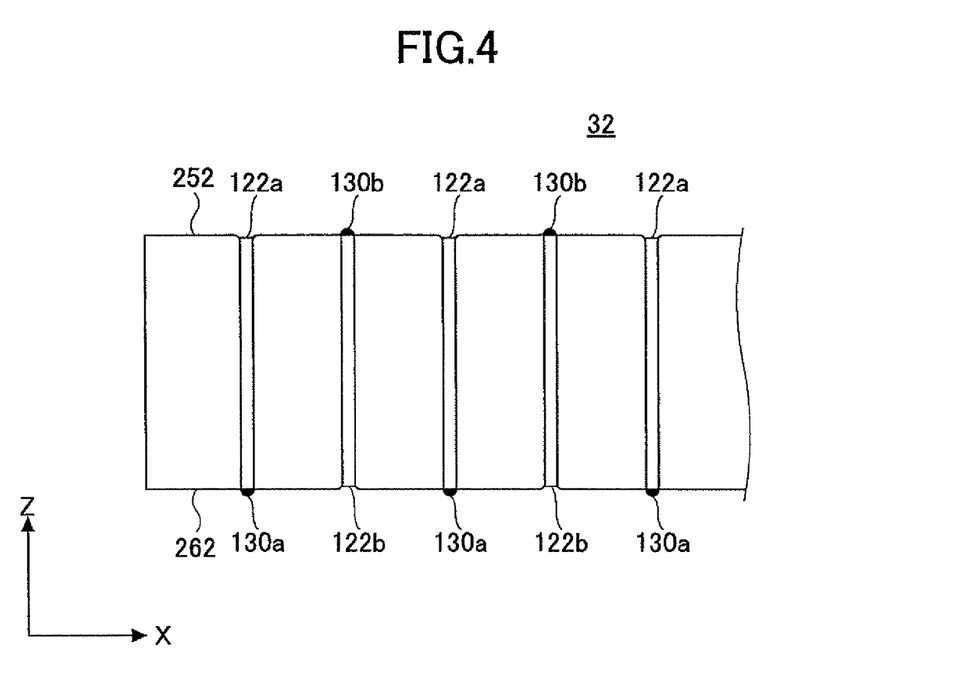
FIG. 4 schematically shows a cross section of another conventional mat material (of Type II)
Figure 6:
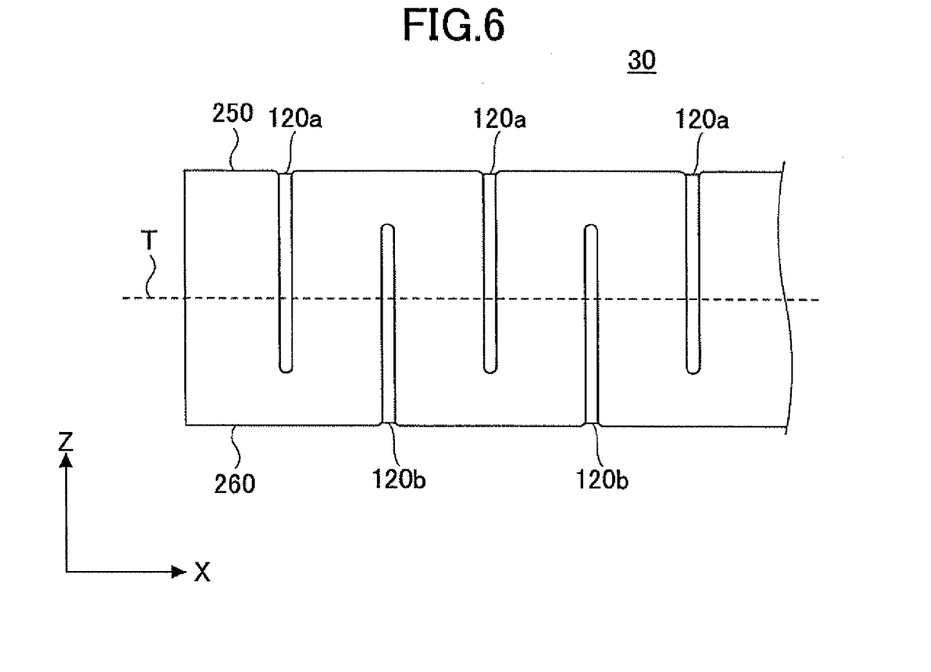
FIG. 6 schematically shows a cross section of a mat material (of Type III) according to an embodiment of the invention.

FIGS. 3 and 4 are enlarged schematic views of cross-sections of portions of mat materials according to the related art. FIG. 6 shows an enlarged schematic view of a cross section of a mat material according to an embodiment of the present invention.

The mat material 30, which contains a number of inorganic fibers, is manufactured by a needling process. The "needling process" refers to a process whereby a needle is pushed and pulled into and out of a laminate sheet as a raw material of the mat material 30, from one surface thereof (in a direction substantially parallel to the thickness direction, for example), so as to cause the inorganic fibers in the laminate sheet to become interlaced in a certain direction. The needling process creates a needle trace (an opening created in the mat material by the pushing and pulling of the needle, which is filled with inorganic fiber bundles; it normally has a diameter on the order of about 0.4 to about 1.0 mm). At such a needle trace portion, the bundles of fibers interlaced in a complex manner are oriented in a certain direction, improving the interlaminar strength of the completed mat material.

However, if the needling process is done in an inappropriate manner, the interlaminar strength may be decreased in the resultant mat material.

For example, if the needling process is carried out using a needle which is inappropriately short relative to the thickness of the completed mat material, no interlaced portion of the inorganic fibers is formed in regions at such depths of the mat material in the thickness direction that the needle cannot reach. In such regions, the interlaminar strength is reduced.

FIG. 3 is an enlarged schematic view of a cross section of a mat material 31 that is obtained when the needling process is carried out using such a "short" needle, from a first surface 251 and a second surface 261 of the mat material. As shown in FIG. 3, needle traces 121 are formed where the pushing and pulling of the needles has taken place. Since the depth of the pushing and pulling of the needles is significantly small relative to the thickness of the completed mat material 31 (more accurately, shorter than about one half the thickness of the completed mat material 31), no needle trace is formed in the intermediate thickness portion of the mat material 31. Instead, in this portion, a region 151 with less interlacing of the inorganic fibers and reduced interlaminar strength is produced. (Hereafter, a mat material including such a region in which there is no needle trace from either surface of the mat material as viewed in the thickness direction, as in the case of the region 151 with reduced interlaminar strength, is referred to as a Type I mat material). This problem tends to occur particularly when the completed mat material has a large thickness (i.e., on the order of about 10 μm to about 20 mm).

If the mat material 31 having the region 151 with reduced interlaminar strength is used as a retaining/sealing material in an exhaust gas treating apparatus, peeling may develop in the layers of the retaining/sealing material when winding it around an exhaust gas treating member or during the actual use of the exhaust gas treating apparatus.

Thus, in order to prevent such a problem, in a conventional needling process, needles that are sufficiently long compared to the thickness of the completed mat material are used. In this case, the needles can pierce the mat material and reach the surface on the other side while catching the inorganic fibers in the thickness direction, thus penetrating the entire thickness of the mat material. In this "penetrating" needling process, the inorganic fibers can be interlaced throughout the thickness of the mat material, whereby the aforementioned problem of formation of the region 151 with reduced interlaminar strength can be prevented.

FIG. 4 shows a schematic enlarged cross section of a mat material 32 obtained by the "penetrating" needling process. As shown in FIG. 4, in this mat material 32, the needling process is performed from both sides of the mat material; i.e., a first surface 252 and a second surface 262. By the penetrating needling process from the first surface 252 of the mat material, needling traces 122a are formed; by the penetrating needling process from the second surface 262 of the mat material, needling traces 122b are formed. Because of the formation of the needling traces 122a and 122b, a sufficient interlaminar strength can be ensured in the mat material 32 in the thickness direction.

However, in the penetrating needling process, the long needles are pushed and pulled into and out of the mat material 32 from the first surface 252 in the thickness direction until they penetrate the second surface 262, or from the second surface 262 in the thickness direction until they penetrate the first surface 252. As a result, as shown in FIG. 4, at the end of the needle traces 122a on the second surface 262, which are formed by the pushing and pulling of the needles from the first surface 252, protrusions 130 (130a) of inorganic fiber bundles are produced by the pushing of the needles toward the second surface 262. Similarly, at the end of the needle traces 122b on the side of the first surface 252, which are formed by the pushing and pulling of the needle from the second surface 262, protrusions 130 (130b) of inorganic fiber bundles are produced by the pushing of the needles toward the first surface 252 (hereafter, a mat material having such penetrating needle traces is referred to as a Type II mat material).

Figure 5:
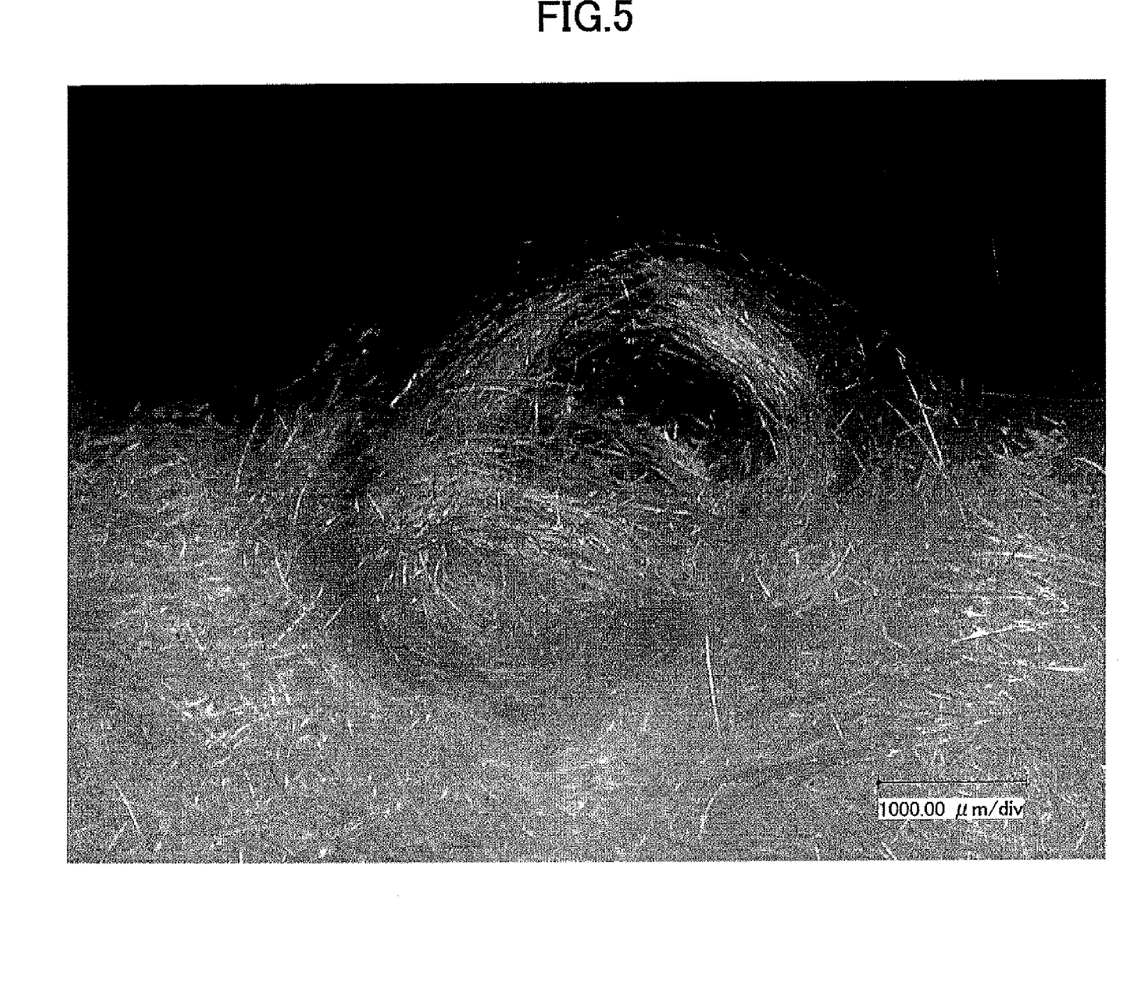
FIG. 5 shows an optical microscopic image of a protrusion of an inorganic fiber bundle observed on a surface of the mat material shown in FIG. 4.

FIG. 5 shows an optical microscopic image of a protrusion 130 of inorganic fiber bundles that developed at an opening of a needle trace in a mat material manufactured by the penetrating needling process. In the shown example, a looped protrusion with a diameter of about 2 mm is formed on the mat material surface.

These protrusions 130 (130a, 130b) of such inorganic fiber bundles may stick the skin of a worker as he handles the mat material, or it may be easily broken and scattered in the air, thus adversely affecting the working environment. Therefore, the protrusions 130 of inorganic fiber bundles need to be eliminated as much as possible.

It is noted that in the present disclosure, the "protrusion of an inorganic fiber bundle" refers to those fibrous bundles of inorganic fibers having a diameter of about 1 to 5 mm, which are formed at the opening of a needle trace on a surface of a mat material (in a case where the mat material is penetrated by the needle traces), or which are formed at a location on a surface opposite to the surface where an opening of a needle trace is formed at which location a line extending from the needle trace intersects the opposite surface (in a case where the needle trace is not penetrating).

On the other hand, the mat material 30 of an embodiment of the present invention has a cross-sectional structure schematically shown in FIG. 6. In this mat material 30, the needling process is performed from both sides of the mat material 30, i.e., a first surface 250 and a second surface 260. Specifically, needling traces 120a are formed by the needling from the first surface 250 of the mat material 30, while needling traces 120b are formed by the needling from the second surface 260 of the mat material 30.

In the mat material 30, the needling traces 120a and 120b penetrate the mat material beyond a central thickness portion T (shown by a broken line in FIG. 6) from each surface. Thus, no such region as the region 151 shown in FIG. 3 having less interlacing of inorganic fibers and reduced interlaminar strength is formed. Furthermore, since none of the needling traces 120a and 120b penetrate through the mat material 30, no such protrusion of an inorganic fiber bundle as the aforementioned protrusion 130 is formed on either the surface 250 or 260 (hereafter, such a mat material having no region where a needle trace from any surface is not formed (i.e., the region 151 having reduced interlaminar strength) and having no needle trace penetrating therethrough is referred to as a Type III mat material).

Because of the needling traces 120a and 120b thus formed, a sufficient interlaminar strength can be obtained throughout the thickness of the mat material 30, and good handleability can be obtained due to the absence of the protrusion 130 on either surface.

In the example of the mat material shown in FIG. 6, both the needle traces 120a and 120b extend parallel to the thickness direction of the mat material 30 (in the z-direction in FIG. 6). The direction of extension of the needle traces 120a and 120b, however, may not be parallel to the thickness direction.

Figure 7:
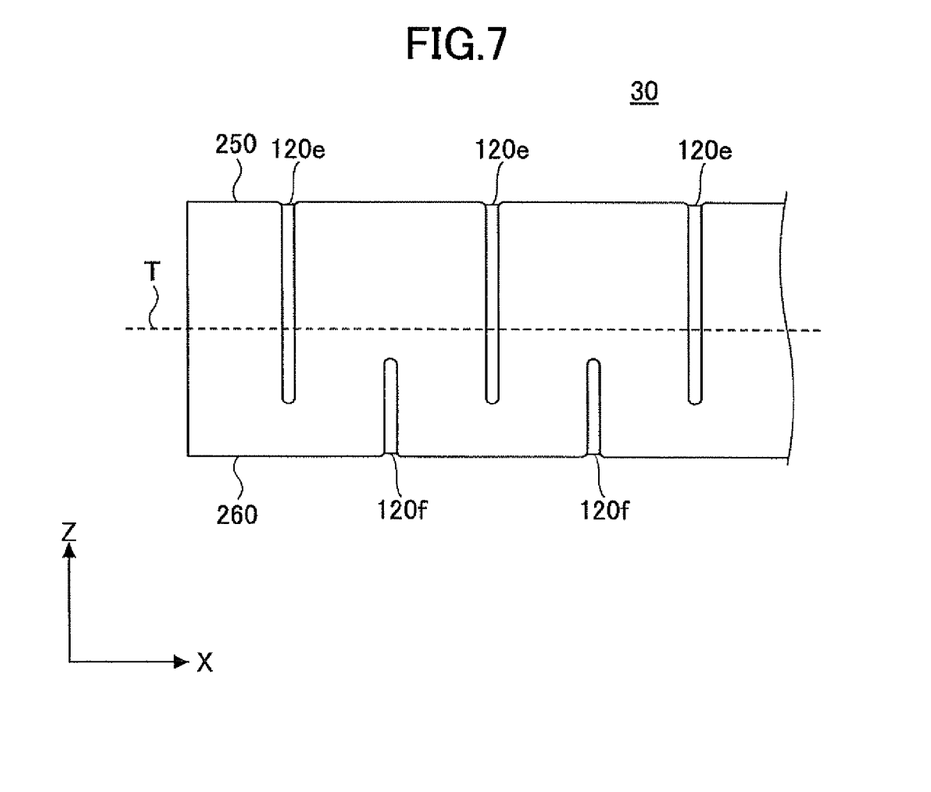
FIG. 7 schematically shows a cross section of a mat material according to another embodiment of the invention.

In the mat material shown in FIG. 6, both the needling traces 120a and 120b have their tips penetrating beyond approximately the half depth of the mat material 30 (i.e., the position T in FIG. 6). However, this is merely an example; in another embodiment, the mat material may be formed as shown in FIG. 7. In this embodiment, while needle traces 120e that extend from the first surface 250 penetrate down to a comparable depth to the needle traces 120a shown in FIG. 6, needle traces 120f that extend from the second surface 260 do not reach regions beyond about one half the thickness of the mat material 130 (indicated by the broken line T). It should be obvious to one skilled in the art that the aforementioned effects of the embodiment of FIG. 6 can also be obtained by the mat material shown in FIG. 7 having such needle traces 120e and 120f.

Namely, what is important is that there is no region along the thickness of the mat material where there is no needle trace from either surface, and that none of the needling traces from either side penetrate through to the surface on the other side of the mat material 30 (or more accurately, that no protrusion 130 of inorganic fiber bundles is formed on the opposite surface). As long as these requirements are satisfied, the depth of the needle traces does not matter.

Figure 8:
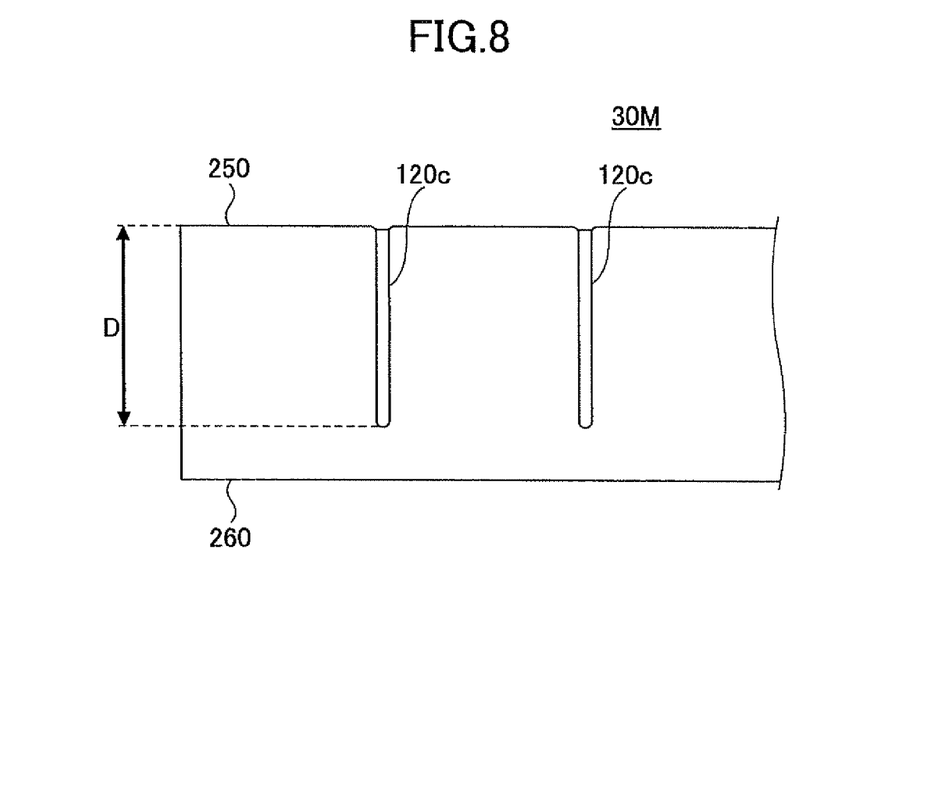
FIG. 8 illustrates how a penetration depth D is defined for a needle trace in a mat material.
Figure 9:
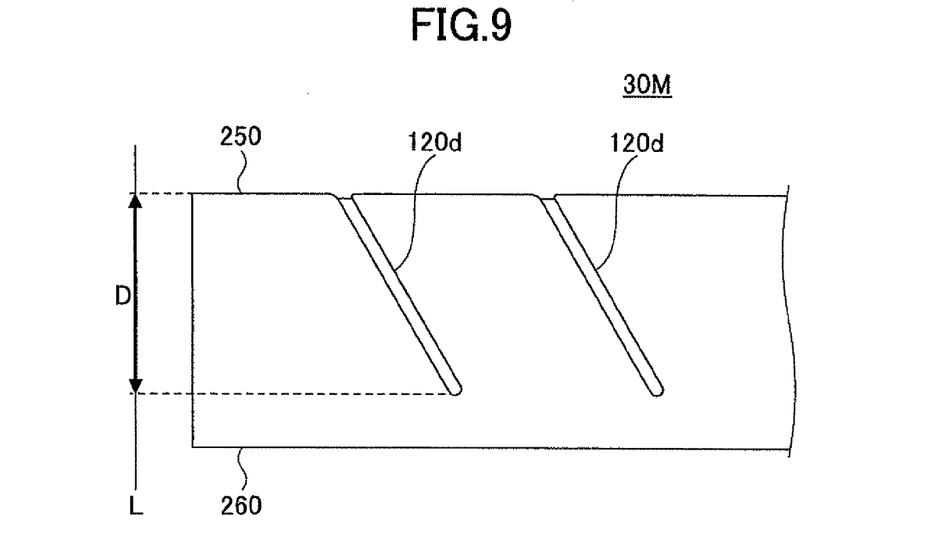
FIG. 9 illustrates how a penetration depth D is defined for another needle trace in a mat material.

With reference to FIGS. 8 and 9, a method of measuring the depth of a needle trace (hereafter referred to as a "penetration depth D") formed in a mat material manufactured by the needling process is described. The penetration depth D of the needle trace can be measured as follows.

In a first step, a mat material 30M for measurement (length 25 mm×width 25 mm) is cut by a cutter or the like in a direction substantially parallel to the thickness direction, along a straight line connecting the centers of the openings of plural needle traces 120c that exist on one surface (such as the first surface 250).

In a case where the needle traces extend substantially parallel to the thickness direction of the mat material 30M, as shown in FIG. 8, one of the needle traces 120c having the maximum depth from the surface based on visual inspection of the resultant cross section is selected, and its length is measured. This operation is repeated five times, and a mean value of the obtained measurement values is defined as the penetration depth D of the needle traces.

If the needle traces are inclined with respect to the thickness direction of the mat material 30M, as shown in FIG. 9, a line is drawn from the tip of a needle trace 120d normal to a line L parallel to the thickness of the mat material 30M, and an intersecting point is determined. Then, the distance from the surface 250 of the mat material on which an opening of the needle trace 120d is located to the intersecting point is measured. This operation is repeated five times, and a mean of the obtained measurement values is defined as the penetration depth D of the inclined needle trace. If it is discovered during visual inspection of the cross section that the needle traces are penetrating through the mat material, the thickness of the mat material is defined as the penetration depth D of the needle trace regardless of the direction of extension of the needle trace.

The basis weight (weight per unit area) of the mat material of various embodiments of the present invention is not particularly limited; for example, it may be in the range of from about 900 g/m² to about 3000 g/m². Preferably, it is in the range of from about 1500 g/m² to about 2800 g/m². The thickness of the mat material is also not particularly limited; for example, it may be in the range of from about 6 mm to about 31 mm. Preferably, it is in the range of from about 9 mm to about 20 mm.

Figure 10:
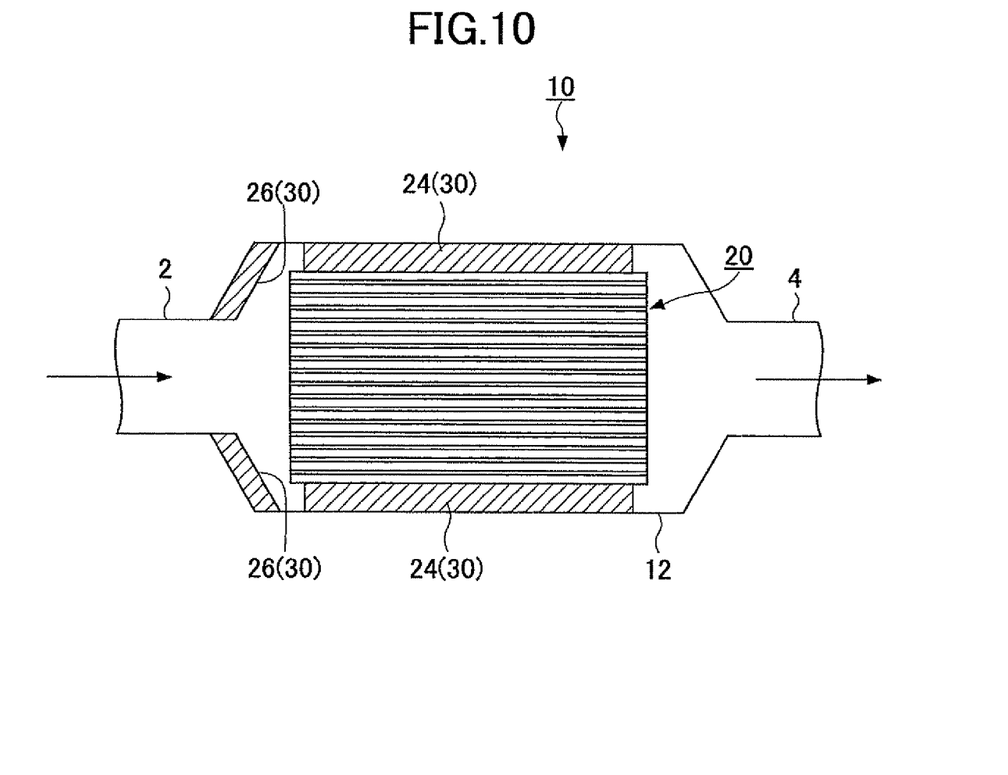
FIG. 10 shows an exhaust gas treating apparatus according to an embodiment of the invention.

The mat material described above may be used as a retaining/sealing material and/or a heat-insulating material in an exhaust gas treating apparatus. FIG. 10 shows a structure of an exhaust gas treating apparatus 10.

The exhaust gas treating apparatus 10 comprises an exhaust gas treating member 20 on an external circumferential surface of which the retaining/sealing material 24 is wound; the casing 12 for housing the exhaust gas treating member; and an inlet pipe 2 and an outlet pipe 4 for exhaust gas connected to the inlet and outlet sides of the casing 12, respectively. The inlet pipe 2 and the outlet pipe 4 are tapered such that they have increased diameters where they are connected to the casing 12. In the tapered portion of the inlet pipe 2, a heat-insulating material 26 is disposed to prevent the heat inside the exhaust gas treating apparatus 10 from being transmitted to the outside via the inlet pipe 2. In the illustrated example, the exhaust gas treating member 20 has open planes for the inlet and outlet of exhaust gas. The exhaust gas treating member 20 is a catalyst supporter having a number of through holes in the direction parallel to the flow of gas. The catalyst supporter may be formed by honeycombed porous silicon carbide. In another example, the exhaust gas treating member 20 may be formed by a DPF (diesel particulate filter) in which some of the through holes are closed.

The retaining/sealing material 24 and the heat-insulating material 26 are formed of the mat material 30 according to an embodiment of the present invention. Thus, in this exhaust gas treating apparatus, improved handleability of the retaining/sealing material and the heat-insulating material can be obtained due to the aforementioned effects of the mat material 30. Furthermore, the problem of interlaminar peeling in the intermediate thickness portion of the retaining/sealing material and/or the heat-insulating material can be prevented during the installation of the retaining/sealing material and/or the heat-insulating material, or during actual use of the exhaust gas treating apparatus.

Figure 11:
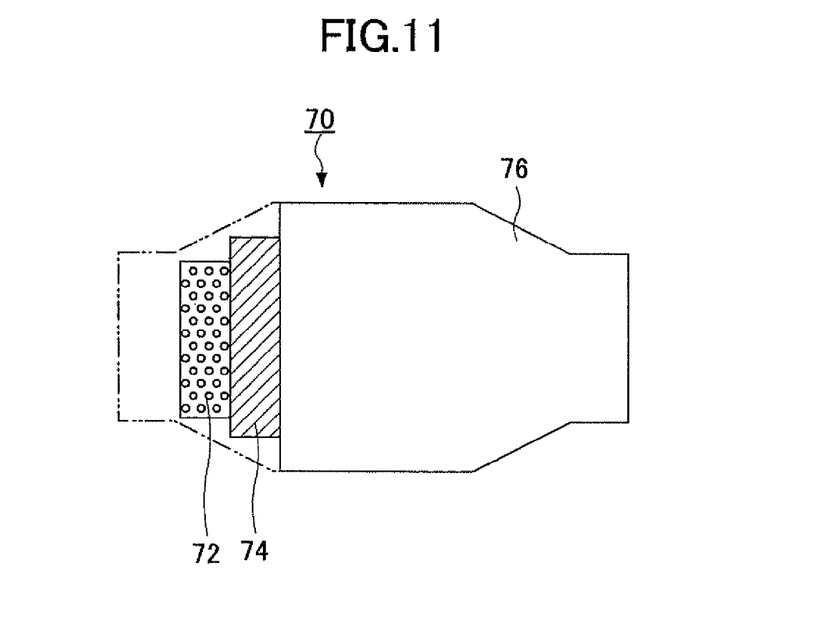
FIG. 11 shows a muffler according to an embodiment of the invention.

Hereafter, another example of the application of the mat material is described. FIG. 11 shows a muffler 70 comprising a mat material according to an embodiment of the present invention. The muffler 70, which may be mounted on an exhaust pipe of an automobile engine, comprises an inner pipe 72 (made of a metal such as stainless steel); an outer shell 76 (made of a metal such as stainless steel) that covers the inner pipe 72; and a sound absorbing material 74 disposed between the inner pipe 72 and the outer shell 76. Normally, the surface of the inner pipe 72 has small openings. The muffler 70 can reduce the noise component of the exhaust as the exhaust gas flows through the sound absorbing material 74 within the inner pipe 72.

The sound absorbing material 74 may comprise the mat material 30 of an embodiment of the present invention. In this way, improved handleability can be obtained when installing the sound absorbing material 74 to the muffler 70.

In the following, a method of manufacturing the mat material of an embodiment of the invention shown in FIG. 6 is described.

First, a laminate sheet consisting of inorganic fibers is prepared. While in the following description the inorganic fibers consist of a mixture of alumina and silica, this is merely exemplary and other inorganic fiber materials may be used. For example, the fibers may consist of either alumina or silica alone. A silica sol is added to a basic aluminum chloride aqueous solution with an aluminum content of about 70 g/l and Al/Cl about 1.8 (atomic ratio) to achieve a composition ratio of alumina to silica of about 60-80 to about 40-20, for example, thereby preparing an inorganic fiber precursor. Preferably, the alumina to silica composition ratio is about 70-74 to about 30-26. If the proportion of alumina is approximately 60% or smaller, the proportion of mullite formed by alumina and silica decreases, whereby the thermal conductivity of the completed mat material increases and a sufficient heat insulating property cannot be obtained.

In the next step, an organic polymer such as polyvinyl alcohol is added to the alumina-based fiber precursor. The resultant solution is condensed to prepare a spinning solution. Further, using the spinning solution, fiber spinning is performed by a blowing method.

The blowing method is a method for fiber spinning using an air flow blown out of an air nozzle and a spinning solution flow pushed out of a spinning solution supply nozzle. The gas flow velocity from the air nozzle per slit is normally about 40 m/s to about 200 m/s. The diameter of the fiber spinning nozzle normally ranges from about 0.1 mm to about 0.5 mm. The fluid volume per spinning solution supply nozzle normally ranges from about 1 to about 120 ml/h and preferably from about 3 to about 50 ml/h. Under these conditions, the spinning solution can be pushed out of the spinning solution supply nozzle in a sufficiently drawn manner without being sprayed (in the form of a mist), so that the fibers do not easily adhere to each other. Thus, by optimizing the fiber spinning conditions, a uniform alumina fiber precursor having a narrow fiber diameter distribution can be obtained.

Preferably, the average fiber length of the thus manufactured alumina-based fiber is about 250 μm or greater and is more preferably about 500 μm or greater. If the average fiber length is less than about 250 μm, fibers do not become sufficiently interlaced with each other and so a sufficient strength cannot be obtained. The average diameter of the inorganic fibers is not particularly limited; preferably, it is in the range of from about 3 to 8 μm and more preferably in the range of from about 5 to 7 μm.

The precursor after the fiber spinning process is then laminated to prepare a laminate sheet. The laminate sheet is further subjected to a needling process, normally using a needling device.

Normally, a needling device comprises a first needle board disposed opposite a first surface of the laminate sheet, the first needle board being reciprocally movable in the piercing direction (which is normally the up-and-down direction); and a second needle board disposed opposite a second surface of the laminate sheet, the second needle board being reciprocally movable in the piercing direction (which is normally in the up-and-down direction). The first and the second needle boards include first and second supporter plates, respectively, that are disposed on the first and the second surfaces of the laminate sheet, respectively, during the needling process. The first and the second needle boards have a number of needles configured to pierce the laminate sheet, wherein the density of the needles may be in the range of from about 25 to 5000 needles per 100 cm$^2$. The first and the second supporter plates have a number of through holes so that the needles can pierce through the supporter plates into the laminate sheet. Thus, the needling process can be performed from the surfaces on both sides of the laminate sheet by moving the first and the second needle boards closer to and away from the laminate sheet with the sheet pressed on both sides by the respective supporter plates. It should be noted that those needles need to be arranged such that the needles on one needle board do not collide with the needles on the other needle board during the needling process.

The needling process of the present invention is carried out such that the needles that pierce one surface do not penetrate through the laminate sheet (which would render the mat material Type II) or such that the piercing depth of the needles does not become insufficient (which would render the mat material Type I). Specifically, the needling process is carried out in the following manner:

(1) When the thickness P of the completed mat material is relatively thick (P>10 mm), the stroke amounts of the first and the second needle boards (i.e., the amount of up-and-down movement with respect to the laminate sheet) are controlled such that the penetration depth D of a needle trace in the completed mat material is in the range of about 0.6P≦D≦about 0.8P.

(2) When the thickness P of the completed mat material is relatively thin (P≦10 mm), the stroke amounts of the first and the second needle boards are controlled such that the penetration depth D of a needle trace in the completed mat material is in the range of about 0.6P≦D≦about 0.7P.

The stroke amounts of the needle boards are thus varied depending on the thickness P of the completed mat material because of the possibility that, particularly in the case of a relatively small thickness of the completed mat material, the completed mat material could be rendered Type II instead of Type III unless the penetration depth of the needle trace is accurately controlled.

For example, the lower limit of thickness of a conventional mat material used as a retaining/sealing material is approximately 7 mm. In this case, if the needling process is performed by the above method (1), the distance between the tip of a needle trace that extends from the first surface and the second surface is about 7 mm×0.2=about 1.4 mm in the minimum. Only with such a distance, the protrusion 130 of inorganic fiber bundles can be produced on the second surface of the mat material as is observed in the aforementioned Type II mat material, even if the needle trace does not penetrate through the mat material.

If, on the other hand, the needling process is performed by the method (2), the distance from the second surface is about 7 mm×0.3 about 2.1 mm in the minimum. Therefore, the development of the protrusion 130 of inorganic fiber bundles on the surface opposite to the surface through which the needle pierces can be more reliably prevented.

When the thickness P of the completed mat material exceeds approximately 10 mm, the development of the protrusion 130 of inorganic fiber bundles can be made more difficult to occur if D≦about 0.8P. However, in order to more reliably prevent the development of the aforementioned region 151 having reduced interlaminar strength, it is preferable to make the penetration depth D≧about 0.6P as mentioned above rather than D>0.5P.

In the above example, the penetration depth of the needle trace is controlled by controlling the up-down stroke amounts of the needle boards depending on the thickness of the completed mat material. In another embodiment, the penetration depth of a needle trace may be controlled by controlling the length of the needles installed on the needle board depending on the thickness of the completed mat material. In this case, since the needle board is provided with the needles with a predetermined length, the stroke amount of the needle board can be kept constant despite that the thickness of the completed mat material may change. In this case, however, needles with various lengths must be prepared.

The needling process does not necessarily have to be performed from both sides (and simultaneously). For example, the aforementioned needling process may be performed from the first surface of a laminate sheet, and then the laminate sheet may be inverted to perform the needling process from the second surface thereof.

Thereafter, the laminate sheet that has been subjected to the needling process is heated from room temperature and fired continuously at the maximum temperature of about 1250° C., whereby a mat material of a predetermined basis weight (weight per unit area) can be obtained.

For ease of handling, the resultant mat material is cut into a predetermined size.

The cut-out mat material is then preferably impregnated with an organic binder, such as a resin, whereby the loft of the mat material can be controlled, and improved handleability of the mat material can be obtained. The impregnation also provides the added benefit of improving the retention capacity and sealing property of the mat material. This is because as a high-temperature exhaust gas is introduced into the exhaust gas treating apparatus in use, the organic binding material with which the retaining/sealing material is impregnated is eliminated by heat, whereby the retaining/sealing material that has been compressed is restored, thus blocking any gap that might be present between the casing and the exhaust gas treating member.

Preferably, the content of the organic binder is in the range of from about 0.5 to about 12.0 wt. %. Above approximately 10.0 wt. %, the amount of organic components that are discharged during use of the exhaust gas treating apparatus increases.

Examples of the organic binder that can be used include epoxy resin, acrylic resin, rubber-based resin, and styrenebased resin. Preferable examples are acrylic rubber (ACM), acrylonitrile-butadiene rubber (NBR), and styrene-butadiene rubber (SBR) resin.

Using an aqueous dispersion of such an organic binder and water, the mat material is impregnated with the resin by spray-coating, for example. Excess impregnated solid matter and water contained in the mat material are removed in the subsequent step.

In the next step, excess solid matter is removed and a drying process is performed. Removal of excess solid matter is performed by a suction method. Removal of excess water is performed by a heating/compressing drying method. In this method, the mat material is pressed to remove excess water and make the mat material thinner. Drying is performed at a temperature of about 95° C. to 155° C. If the temperature is lower than about 95° C., drying takes longer and production efficiency decreases. If the temperature is above approximately 155° C., decomposition of the organic binder begins to take place, thus adversely affecting the bonding property of the organic binder.

Through these steps, a mat material of the aforementioned Type III properties is obtained.

When used as a retaining/sealing material, the mat material is cut into a predetermined shape (such as shown in FIG. 1, for example).

In the foregoing description, a method of manufacturing the mat material shown in FIG. 6 has been described. It should be obvious to those skilled in the art, however, that the same method can be employed for manufacturing the mat material shown in FIG. 7. In this case, the needling process is initially performed from the first surface by the above method (1) or (2) (to a penetration depth D1 of the needle trace, with respect to the thickness P of the completed mat material), and then the needling process is performed from the second surface while the stroke amount of the second needle board is controlled such that the penetration depth D2 of the needle trace from the second surface is in the range of about P-D1<D2<about 0.5P.

In the following, various examples are described.

Example 1

A mat material was manufactured by the following procedure.

A silica sol was added to a basic aluminum chloride aqueous solution with an aluminum content of 70 g/l and Al/C=11.8 (atomic ratio) to achieve an alumina-based fiber composition of $Al_2O_3:SiO_2=72:28$, thereby forming an alumina-based fiber precursor.

Then, an organic polymer such as polyvinyl alcohol was added to the alumina-based fiber precursor. The solution was further condensed to obtain a spinning solution, with which fiber spinning was performed by a blowing method. Thereafter, the alumina-based fiber precursor was folded and laminated to obtain an alumina-based fiber laminate sheet.

The laminate sheet was then subjected to a needling process which involved a pair of needle boards, each having a set of 50 needles per 100 $cm^2$. These needle boards were disposed on either side of the laminate sheet, and moved up and down from either side of the laminate sheet substantially along the thickness direction of the laminate sheet. The penetration depth of the needles from each side was 6.0 mm.

Thereafter, the resultant mat material was heated from room temperature to the maximum temperature of 1250° C. at which it was continuously fired, whereby an alumina-based fiber mat material having the basis weight of 1500 $g/cm^2$ and the density of 0.16 $g/cm^3$ was obtained. The thickness of the completed mat material was 9.1 mm, and the penetration depth of the needle trace was 6.0 mm for both the first and the second surfaces. Thus, the mat material belonged to Type III.

The mat material obtained through the above-described steps, namely, Example 1, was not impregnated with an organic binder as it was later subjected to an interlaminar strength measurement, as will be described below.

Example 2

A mat material according to Example 2 was manufactured by the same method as the foregoing Example 1. In Example 2, the penetration depth of the needle from each surface was set to be 9.5 mm. The basis weight of the mat material was 2000 $g/cm^2$ and the density was 0.16 $g/cm^3$. The thickness of the completed mat material was 12.7 mm, and the penetration depth of the needle trace was 9.5 mm for both the first and the second surfaces. Thus, the mat material of Example 2 belonged to Type III.

Example 3

A mat material according to Example 3 was manufactured by the same method as the foregoing Example 1. In Example 3, the penetration depth of the needle on each surface was set to be 13.1 mm. The basis weight of the mat material was 2600 $g/cm^2$, and the density was 0.15 $g/cm^3$. The thickness of the completed mat material was 17.4 mm, and the penetration depth of the needle trace was 13.1 mm for both the first and the second surfaces. Thus, the mat material of Example 3 belonged to Type III.

Example 4

A mat material according to Example 4 was manufactured by the same method as the foregoing Example 1. In Example 4, the penetration depth of the needle from each surface was set to be 15.0 mm. The basis weight was 2800 $g/cm^2$, and the density was 0.14 $g/cm^3$. The thickness of the completed mat material was 20.1 mm, and the penetration depth of the needle trace was 15.0 mm for both the first and the second surfaces. Thus, this mat material belonged to Type III.

Comparative Example 1

A mat material according to Comparative Example 1 was manufactured by the same method as Example 1, with the exception that the penetration depth of the needle from each surface was set to be 4.0 mm. The basis weight of the mat material was 1500 $g/cm^2$, and the density was 0.16 $g/cm^3$. The thickness of the completed mat material was 9.3 mm, and the penetration depth of the needle trace was 4.0 mm for both the first and the second surfaces. Thus, the mat material belonged to Type I.

Comparative Example 2

A mat material according to Comparative Example 2 was manufactured by the same method as the foregoing Example 1, with the exception that the penetration depth of the needle from each surface was set to be 6.0 mm. The basis weight of the mat material was 2200 $g/cm^2$, and the density was 0.14 $g/cm^3$. The completed mat material had a thickness of 15.4 mm, and the penetration depth of the needle trace was 6.0 mm for both the first and the second surfaces. Thus, the mat material belonged to Type I.

Comparative Example 3

A mat material according to Comparative Example 3 was manufactured by the same method as the foregoing Example 1, with the exception that the penetration depth of the needle from each surface was set to be 8.0 mm. The basis weight of the mat material was 2800 g/cm$^2$, and the density was 0.14 g/cm$^3$. The thickness of the completed mat material was 20.7 mm, and the penetration depth of the needle trace was 8.0 mm for both the first and the second surfaces. Thus, the mat material belonged to Type I.

Comparative Example 4

A mat material according to Comparative Example 4 was manufactured by the same method as the foregoing Example 1, with the exception that the stroke of the needle boards was such that the needles penetrated through the mat material from both surfaces. The basis weight of the completed mat material was 1500 g/cm$^2$, and the density was 0.17 g/cm$^3$. The completed mat material had a thickness of 8.6 mm, through which needle traces had penetrated. Thus, the mat material belonged to Type II.

Comparative Example 5

A mat material according to Comparative Example 5 was manufactured by the same method as the foregoing Example 1 with the exception that the stroke of the needle boards was such that the needles penetrated through the mat material from each surface. The basis weight of the completed mat material was 2000 g/cm$^2$, and the density was 0.16 g/cm$^3$. The completed mat material had a thickness of 12.4 mm, through which needle traces had penetrated. Thus, the mat material belonged to Type II.

Comparative Example 6

A mat material according to Comparative Example 6 was manufactured by the same method as the foregoing Example 1, with the exception that the stroke of the needle boards was such that the needles penetrated through the mat material from each surface. The basis weight of the completed mat material was 2800 g/cm$^2$, and the density was 0.14 g/cm$^3$. The completed mat material had a thickness of 19.6 mm, through which needle traces had penetrated. Thus, the mat material belonged to Type II.

Measurement of Interlaminar Strength

The interlaminar strength of each of the mat materials manufactured by the foregoing methods was measured. First, a sample of 200 mm in length×50 mm in width was acquired from each of the mat materials.

Figure 12:
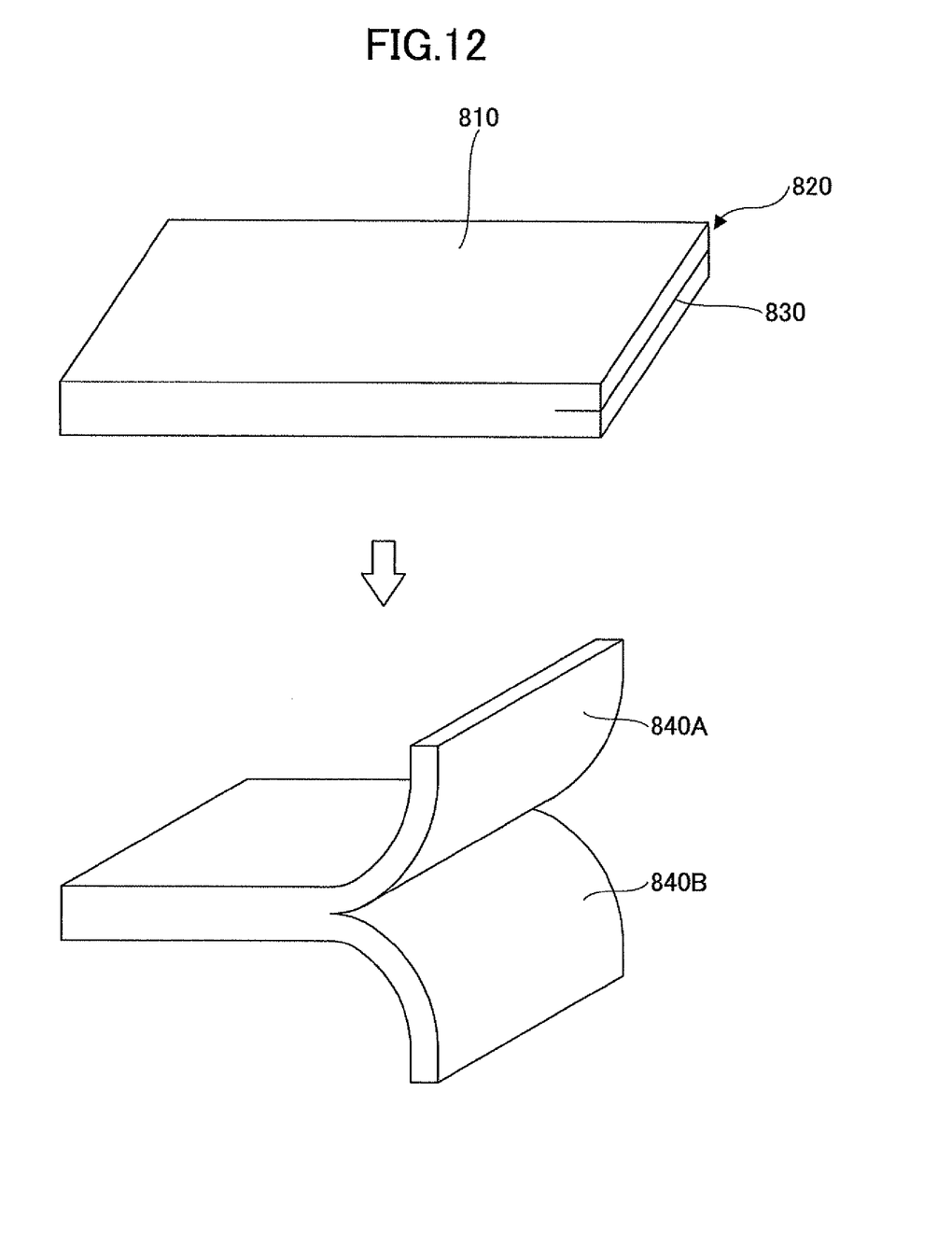
FIG. 12 shows a sample for measuring interlaminar strength.

Then, as shown in FIG. 12, an end surface 820 of a sample 810 that has the 50 mm width was cut with a cutter to provide a cut line 830 that divided the thickness of the sample substantially in half. A sample 810 was then peeled off along the cut line 830, thus separating the sample 810 in the lengthwise direction by about 100 mm. The ends of the two separated portions 840A and 840B were attached to an upper chuck (movable chuck) and a lower chuck (fixed chuck), respectively, of a tensile testing machine (Instron 5567). The upper chuck was then moved vertically upwardly at the rate of 10 mm/min., thereby peeling the two portions off each other at substantially the central thickness position, and the ultimate load was measured. This measurement was repeated three times, and an average of the measured values was defined as the peeling strength (N) of the sample.

Observation of a Surface Protrusion

The surface of each of the mat materials obtained by the foregoing method was observed with an optical microscope (with magnifying power of 25), to investigate the presence or absence of any protrusion of an inorganic fiber bundle at a needle trace (or on an extension from a needle trace).

Evaluation Results

The results of the measurement of interlaminar strength of each sample and the observation of the protrusion of an inorganic fiber bundle are shown in Table 1.

TABLE 1

| Sample | Type | Basis weight (g/cm$^2$) | Density (g/cm$^3$) | Thickness (mm) | Interlaminar strength (N) | Fiber bulge |
|---|---|---|---|---|---|---|
| Ex. 1 | III | 1500 | 0.16 | 9.1 | 3.2 | No |
| Ex. 2 | III | 2000 | 0.16 | 12.7 | 3.2 | No |
| Ex. 3 | III | 2600 | 0.15 | 17.4 | 2.9 | No |
| Ex. 4 | III | 2800 | 0.14 | 20.1 | 2.6 | No |
| Comp. Ex. 1 | I | 1500 | 0.16 | 9.3 | 0.3 | No |
| Comp. Ex. 2 | I | 2200 | 0.14 | 15.4 | 0.3 | No |
| Comp. Ex. 3 | I | 2800 | 0.14 | 20.7 | 0.2 | No |
| Comp. Ex. 4 | II | 1500 | 0.17 | 8.6 | 3.5 | Yes |
| Comp. Ex. 5 | II | 2000 | 0.16 | 12.4 | 3.4 | Yes |
| Comp. Ex. 6 | II | 2800 | 0.14 | 19.6 | 3.2 | Yes |

There was no formation of a protrusion of an inorganic fiber bundle on the surface of the mat materials of Comparative Examples 1 to 3; i.e., Type I mat materials. However, the interlaminar strength of these mat materials was on the order of 0.3N, indicating a very poor interlaminar strength. In the case of the mat materials of Comparative Examples 4 to 6, namely, the Type II mat materials, the interlaminar strength was on the order of 3.2N to 3.5N, which are greatly larger than the corresponding values of Comparative Examples 1 to 3. However, in all of the mat materials of Comparative Examples 4 to 6, formation of a protrusion of an inorganic fiber bundle was observed at the location of a surface opening of a needle trace.

In the mat materials of Examples 1 to 4, while interlaminar strengths comparable to those of Comparative Examples 4 to 6 were observed, there was no formation of a protrusion of an inorganic fiber bundle on the surface of the mat material of any of these examples at the location of an extension from the needle trace. Thus, the mat materials according to the embodiment of the present invention had sufficient interlaminar strengths, and had no protrusion of an inorganic fiber bundle. The mat materials according to the embodiment of the invention are therefore advantageous in that they do not adversely affect the working environment.

The retaining/sealing materials and the exhaust gas treating apparatuses according to the invention may be applied in an exhaust gas treating apparatus for vehicles.

Although the invention has been described with reference to particular embodiments and examples, numerous variations and modifications will be apparent to those skilled in the art without departing from the scope of the invention.

What is claimed is:

1. A mat material comprising:
   inorganic fibers; and
   plural first and second needle traces formed by a needling process, wherein the first needle traces extend from a first surface toward a second surface and the second needle traces extend from the second surface toward the first surface, wherein at least one of the first needle traces that extends from the first surface has a penetration depth D which is greater than one half of a thickness of the mat material and smaller than the thickness of the mat material, wherein at least one of the second needle traces that extends from the second surface reaches a depth greater than a value obtained by subtracting the penetration depth D from the thickness of the mat material, wherein there is no protrusion of an inorganic fiber bundle at a position on the second surface that lies on a line extending from a first needle trace extending from the first surface, wherein there is no protrusion an inorganic fiber bundle at a position on the first surface that lies on a line extending from a second needle trace extending from the second surface, and wherein for a mat thickness P greater than 10 mm, the penetration depth D of the first needle traces is in the range of $0.6P \leqq D \leqq 0.8P$, and wherein for a mat thickness P less than or equal to 10 mm, the penetration depth D of the first needle traces is in the range of $0.6P \leqq D \leqq 0.7P$.

2. The mat material according to claim 1, wherein the mat material has a basis weight in a range of from about 1500 g/m$^2$ to about 2800 g/m$^2$ and a thickness in a range of from about 9 mm to about 20 mm.

3. The mat material according to claim 1, further comprising:
an inorganic binder and/or an organic binder.

4. The mat material according to claim 1, wherein the inorganic fibers comprise a mixture of alumina and silica.

5. An exhaust gas treating apparatus comprising:
a casing;
an exhaust gas treating member housed in the casing; and
the mat material according to claim 1.

6. The exhaust gas treating apparatus according to claim 5, wherein the mat material is wound around at least a part of an external circumferential surface of the exhaust gas treating member.

7. The exhaust gas treating apparatus according to claim 5, further comprising:
an inlet pipe disposed at an entry portion of the exhaust gas treating member; and
an outlet pipe disposed at an exit portion of the exhaust gas treating member,
wherein the mat material is used as a heat-insulating material disposed at least a portion of the inlet pipe.

8. The exhaust gas treating apparatus according to claim 5, wherein the exhaust gas treating member comprises an exhaust gas filter or a catalyst supporter having catalyst.

9. A muffler comprising:
an inner pipe;
an outer shell covering the inner pipe; and
a sound absorbing material disposed between the inner pipe and the outer shell and comprising the mat material according to claim 1.

10. The mat material according to claim 1, wherein the at least one of the second needle traces that extends from the second surface reaches the depth that is less than one half of the thickness of the mat material.

11. A mat material comprising:
inorganic fibers; and
plural first and second needle traces formed by a needling process, wherein the first needle traces extend from a first surface toward a second surface and the second needle traces extend from the second surface toward the first surface, wherein at least one of the first needle traces that extends from the first surface reaches a depth that is greater than one half of a thickness of the mat material, wherein at least one of the second needle traces that extends from the second surface reaches a depth that is greater than one half of a thickness of the mat material, wherein there is no protrusion of an inorganic fiber bundle at a position on the second surface that lies on a line extending from a first needle trace extending from the first surface, wherein there is no protrusion an inorganic fiber bundle at a position on the first surface that lies on a line extending from a second needle trace extending from the second surface, and wherein for a mat thickness P greater than 10 mm, the penetration depth D of the first needle traces is in the range of $0.6P \leqq D \leqq 0.8P$, and wherein for a mat thickness P less than or equal to 10 mm, the penetration depth D of the first needle traces is in the range of $0.6P \leqq D \leqq 0.7P$.

12. The mat material according to claim 11, wherein the mat material has a basis weight in a range of from about 1500 g/m$^2$ to about 2800 g/m$^2$ and a thickness in a range of from about 9 mm to about 20 mm.

13. The mat material according to claim 11, further comprising:
an inorganic binder and/or an organic binder.

14. The mat material according to claim 11, wherein the inorganic fibers comprise a mixture of alumina and silica.

15. An exhaust gas treating apparatus comprising:
a casing;
an exhaust gas treating member housed in the casing; and
the mat material according to claim 11.

16. The exhaust gas treating apparatus according to claim 15, wherein the mat material is wound around at least a part of an external circumferential surface of the exhaust gas treating member.

17. The exhaust gas treating apparatus according to claim 15, further comprising:
an inlet pipe disposed at an entry portion of the exhaust gas treating member; and
an outlet pipe disposed at an exit portion of the exhaust gas treating member,
wherein the mat material is used as a heat-insulating material disposed at least a portion of the inlet pipe.

18. The exhaust gas treating apparatus according to claim 15, wherein the exhaust gas treating member comprises an exhaust gas filter or a catalyst supporter having catalyst.

19. A muffler comprising:
an inner pipe;
an outer shell covering the inner pipe; and
a sound absorbing material disposed between the inner pipe and the outer shell and comprising the mat material according to claim 11.

* * * * *